(12) United States Patent
Oyama

(10) Patent No.: US 10,178,274 B2
(45) Date of Patent: Jan. 8, 2019

(54) IMAGE FORMING APPARATUS USING PWM CONVERSION PROCESSING FOR MAGNIFICATION CORRECTION OF IMAGE

(71) Applicant: CANON KABUSHIKI KAISHA, Tokyo (JP)

(72) Inventor: Naoki Oyama, Kashiwa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/616,772

(22) Filed: Jun. 7, 2017

(65) Prior Publication Data

US 2017/0359486 A1    Dec. 14, 2017

(30) Foreign Application Priority Data

Jun. 13, 2016  (JP) ................. 2016-117244

(51) Int. Cl.
| | |
|---|---|
| *H04N 1/40* | (2006.01) |
| *H04N 1/405* | (2006.01) |
| *G02B 26/12* | (2006.01) |
| *G03G 15/28* | (2006.01) |
| *G03G 15/00* | (2006.01) |
| *H04N 1/06* | (2006.01) |
| *H04N 1/113* | (2006.01) |
| *H04N 1/29* | (2006.01) |
| *H04N 1/409* | (2006.01) |
| *G03G 15/041* | (2006.01) |
| *H04N 1/50* | (2006.01) |
| *H04N 1/393* | (2006.01) |

(52) U.S. Cl.
CPC ......... *H04N 1/4056* (2013.01); *G02B 26/124* (2013.01); *G03G 15/0415* (2013.01); *G03G 15/28* (2013.01); *G03G 15/5095* (2013.01); *H04N 1/06* (2013.01); *H04N 1/113* (2013.01); *H04N 1/295* (2013.01); *H04N 1/4092* (2013.01); *H04N 1/506* (2013.01); *H04N 1/3935* (2013.01); *H04N 2201/0082* (2013.01)

(58) Field of Classification Search
CPC combination set(s) only.
See application file for complete search history.

(56) References Cited

U.S. PATENT DOCUMENTS

| | | | |
|---|---|---|---|
| 7,170,544 B2 | 1/2007 | Horiuchi | ......... 347/247 |
| 9,360,791 B2 | 6/2016 | Oyama | ......... G03G 15/043 |
| 9,658,562 B2 | 5/2017 | Watanabe et al. | ... G03G 15/556 |

(Continued)

FOREIGN PATENT DOCUMENTS

| | | |
|---|---|---|
| JP | 2004-338280 | 12/2004 |
| JP | 2013-022913 | 2/2013 |

OTHER PUBLICATIONS

U.S. Appl. No. 15/489,450, filed Apr. 17, 2017.
U.S. Appl. No. 15/625,954, filed Jun. 16, 2017.

*Primary Examiner* — Barbara Reinier
(74) *Attorney, Agent, or Firm* — Venable LLP

(57) ABSTRACT

In an image forming apparatus that employs a laser scanning optical system that does not use an fθ lens, in the case where magnification correction by insertion/removal of an auxiliary pixel is performed based on the premise of digital PWM, an insertion/removal position of an auxiliary pixel is controlled in accordance with a purpose of each piece of image processing.

5 Claims, 12 Drawing Sheets

(56) References Cited

U.S. PATENT DOCUMENTS

2007/0064248 A1* 3/2007 Horiuchi ............... H04N 1/053
                                                    358/1.7
2013/0027501 A1* 1/2013 Yano .................... B41J 2/471
                                                    347/247
2016/0370727 A1  12/2016 Nakajima et al. ..... G03G 21/14

* cited by examiner

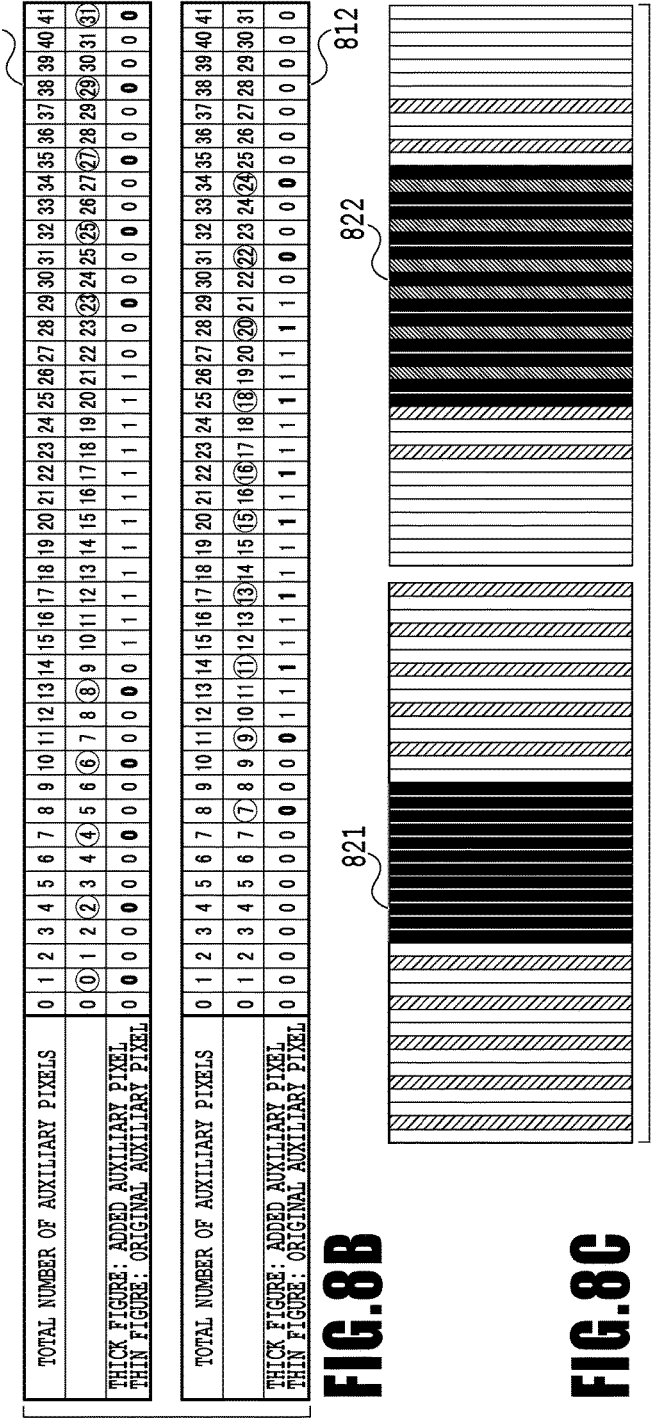

SMOOTHING OFF         SMOOTHING ON

IMAGE FORMING APPARATUS USING PWM CONVERSION PROCESSING FOR MAGNIFICATION CORRECTION OF IMAGE

BACKGROUND OF THE INVENTION

Field of the Invention

The present invention relates to an image correction technique at the time of image formation by an electrophotographic scheme.

Description of the Related Art

An electrophotographic image forming apparatus has an optical scanning unit for exposing a photoconductor. The optical scanning unit irradiates and exposes a photoconductor with a laser beam by emitting the laser beam based on image data, causing a rotating polygon mirror to reflect the emitted laser beam, and causing the laser beam to pass through a scanning lens. Then, a latent image is formed on the photoconductor by performing scanning to move the spot of the laser beam formed on the surface of the photoconductor by rotating the rotating polygon mirror.

Normally, as a scanning lens, a lens having so-called fθ characteristics (hereinafter, fθ lens) is used. Here, the fθ characteristics are optical characteristics that form an image of a laser beam on the surface of a photoconductor by moving the spot of the laser beam on the surface of the photoconductor at a uniform speed on the surface of the photoconductor while a rotating polygon mirror is rotating at a uniform angular speed. By using such an fθ lens, it is possible to perform appropriate exposure. However, the fθ lens is comparatively large and expensive. Because of this, with a view to downsizing the image forming apparatus and to reducing its cost, a configuration that does not use the fθ lens has been discussed. For example, Japanese Patent Laid-Open No. 2004-338280 has disclosed a technique to implement magnification correction in a configuration that does not use an fθ lens by dividing the width in the main scanning direction into predetermined areas and modulating the frequency of a pixel clock in accordance with the magnification for each area. In a laser scanning optical system that does not use an fθ lens, the scanning radius of laser is larger at both ends thereof than that at the center on the main scanning position. FIG. 12 is a graph representing characteristics of a laser scanning optical system that does not uses an fθ lens and the horizontal axis represents the light collected position (image height) in the main scanning direction and the vertical axis represents the scanning speed. From this graph, it is understood that the scanning speed at both end portions is higher than that at the center portion by about 35%. As a result of this, at both end portions of a sheet, the image magnification is increased compared to that at the center portion. Even in the laser scanning optical system in which the magnification of each pixel is different, it is possible to correct the image to the original size by allocating the inverse of the magnification of each pixel as a corrected magnification.

There is also a method of implementing the magnification correction of a pixel based on the premise of digital PWM (Pulse Width Modulation) in place of modulating the frequency of the pixel clock. That is, the magnification correction of a pixel based on the digital PWM is implemented by inserting or removing, a bit data auxiliary pixel to form a sub pixel obtained by dividing one pixel into a plurality of sub pixels in the main scanning direction, into or from a bit pattern making up one pixel. For example, Japanese Patent Laid-Open No. 2013-22913 has disclosed a method of changing the magnification of a pixel by inserting a predetermined number of auxiliary pixels. Here, a case is considered where a number N of divisions of a pixel is thirty-two and a magnification M changes in a range between 1.0 and 1.3 by supposing that this method is applied to a laser scanning optical system that does not use the above-described fθ lens. In this case, a relationship of $(N+D)/N \approx M$ holds, and therefore, it is possible to change the magnification to a desired magnification, for example, such as $(32+10)/32 \approx 1.3$, by selecting, for each pixel, one of integers in a range between 0 and 10, which is a number D of auxiliary pixels that are inserted. It is possible to represent the corrected magnification for each pixel by the number D of auxiliary pixels that are inserted, and therefore, magnification information for each pixel requires only the number of bits capable of representing the number of integers that D can take. In the example described above, the range of integers is between 0 and 10, i.e., eleven in total, and therefore, only four bits are necessary.

With the method of performing magnification correction by inserting or removing an auxiliary pixel based on the premise of digital PWM, it is possible to accurately correct high unevenness in magnification by having correction information for each pixel. However, in the case of the laser scanning optical system that does not use an fθ lens, as described above, the scanning speed at the end portion is higher than that at the center portion by a level of tens %. Because of this, the number of auxiliary pixels that are inserted or removed for magnification correction is necessary in the same ratio. Consequently, in the case where one pixel is divided into auxiliary pixels, the position at which an auxiliary pixel is inserted or removed becomes important in relation to various kinds of image processing that implement a high additional value aiming at high definition and high gradation.

SUMMARY OF THE INVENTION

The image forming apparatus according to the present invention is an image forming apparatus including: a photoconductor; an optical scanning device having a light source that emits a laser beam, a deflection unit configured to deflect the laser beam so that the laser beam scans on the photoconductor, and an optical system that does not have an fθ lens and which guides the laser beam deflected by the deflection unit onto the photoconductor; a conversion unit configured to perform PWM conversion processing for input image data; and a correction unit configured to perform, for each pixel of the image data for which the PWM conversion processing has been performed, magnification correction processing in accordance with a pixel position in a main scanning direction of the laser beam by inserting or removing an auxiliary pixel that is a unit obtained by dividing one pixel in plurality, or by combining insertion and removal, and a position where the auxiliary pixel is inserted or removed is different in accordance with image processing to be applied to the image data.

Further features of the present invention will become apparent from the following description of exemplary embodiments with reference to the attached drawings.

BRIEF DESCRIPTION OF THE DRAWINGS

FIG. 4A to FIG. 4C are diagrams showing examples of various tables;

FIG. 8A to FIG. 8C are explanatory diagrams of auxiliary pixel insertion;

DESCRIPTION OF THE EMBODIMENTS

Hereinafter, with reference to the attached drawings, the present invention is explained in detail in accordance with preferred embodiments. Configurations shown in the following embodiments are merely exemplary and the present invention is not limited to the configurations shown schematically.

First Embodiment (Configuration of Entire Image Forming Apparatus)
<Configuration of Image Forming Apparatus>

Figure 1:
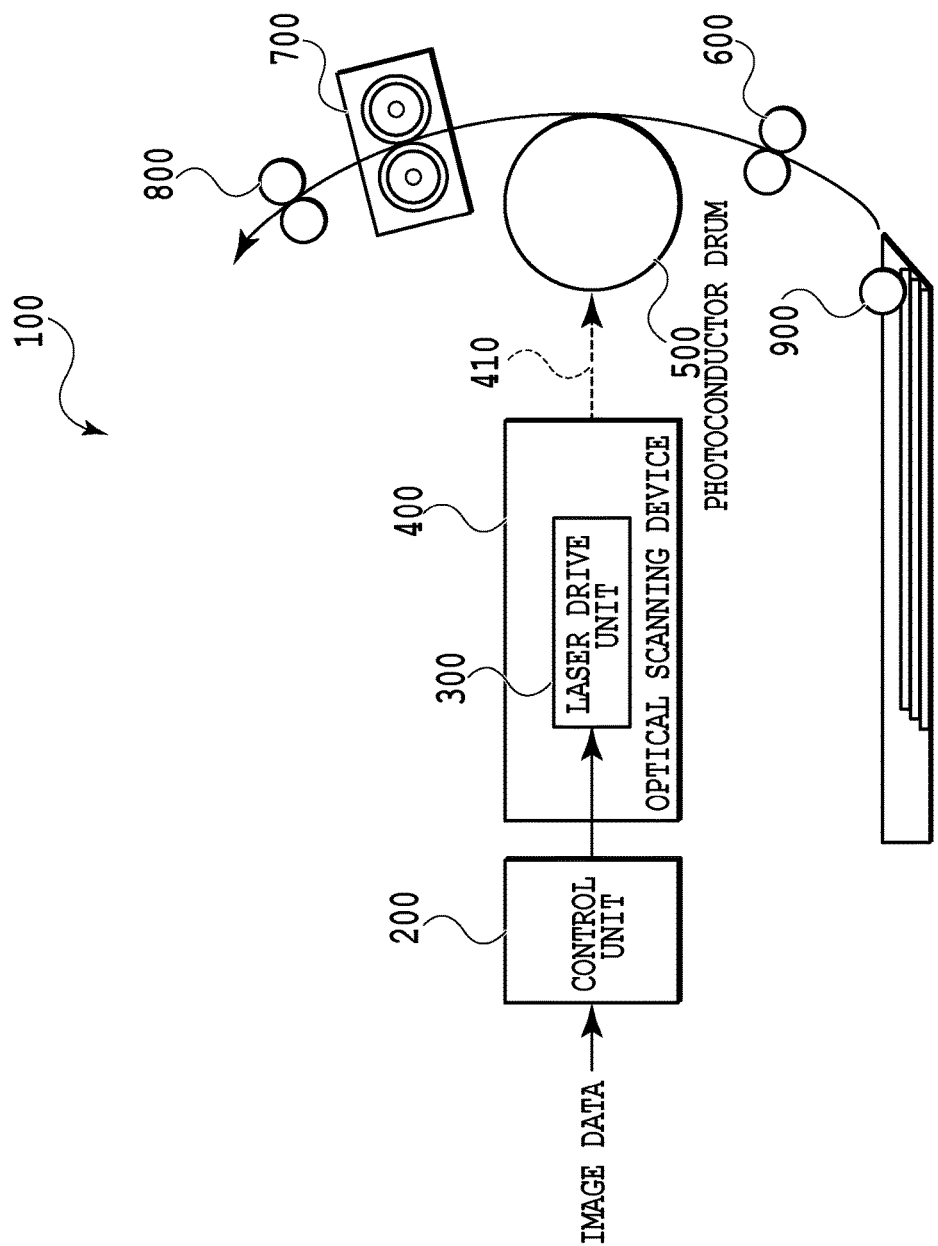
FIG. 1 is a configuration outline diagram of an image forming apparatus.

FIG. 1 is a configuration outline diagram of an image forming apparatus 100 according to the present embodiment. As described in the above-described problem, the image forming apparatus of the present invention premises an electrophotographic image forming apparatus using a laser scanning optical system that does not use an fθ lens or which includes a lens not having fθ characteristics, i.e., a laser scanning optical system in which a scanning speed of a laser beam is not uniform on a photoconductor surface. A laser drive unit 300 within an optical scanning device 400, which is an optical scanning unit, emits a scanning beam (laser beam) indicated by a broken line arrow 410 toward a photoconductor drum 500 based on an image signal (VDO signal) output from a control unit 200. Then, the photoconductor drum (photoconductor) 500 electrified by an electrifying device, not shown schematically, is scanned by the laser beam 410 and a latent image is formed on the surface of the photoconductor drum 500. Then, toner is attached to the latent image thus formed by a developing device, not shown schematically, and a toner image corresponding to the latent image is formed. The toner image is transferred to a printing medium, such as paper, fed from a sheet feed unit 900 and conveyed to the position where the printing medium comes into contact with the photoconductor drum 500 by a roller 600. The toner image transferred to the printing medium is thermally fixed to the printing medium by a fixing unit 700 and discharged out of the apparatus via a sheet discharge roller 800.

Figure 2:
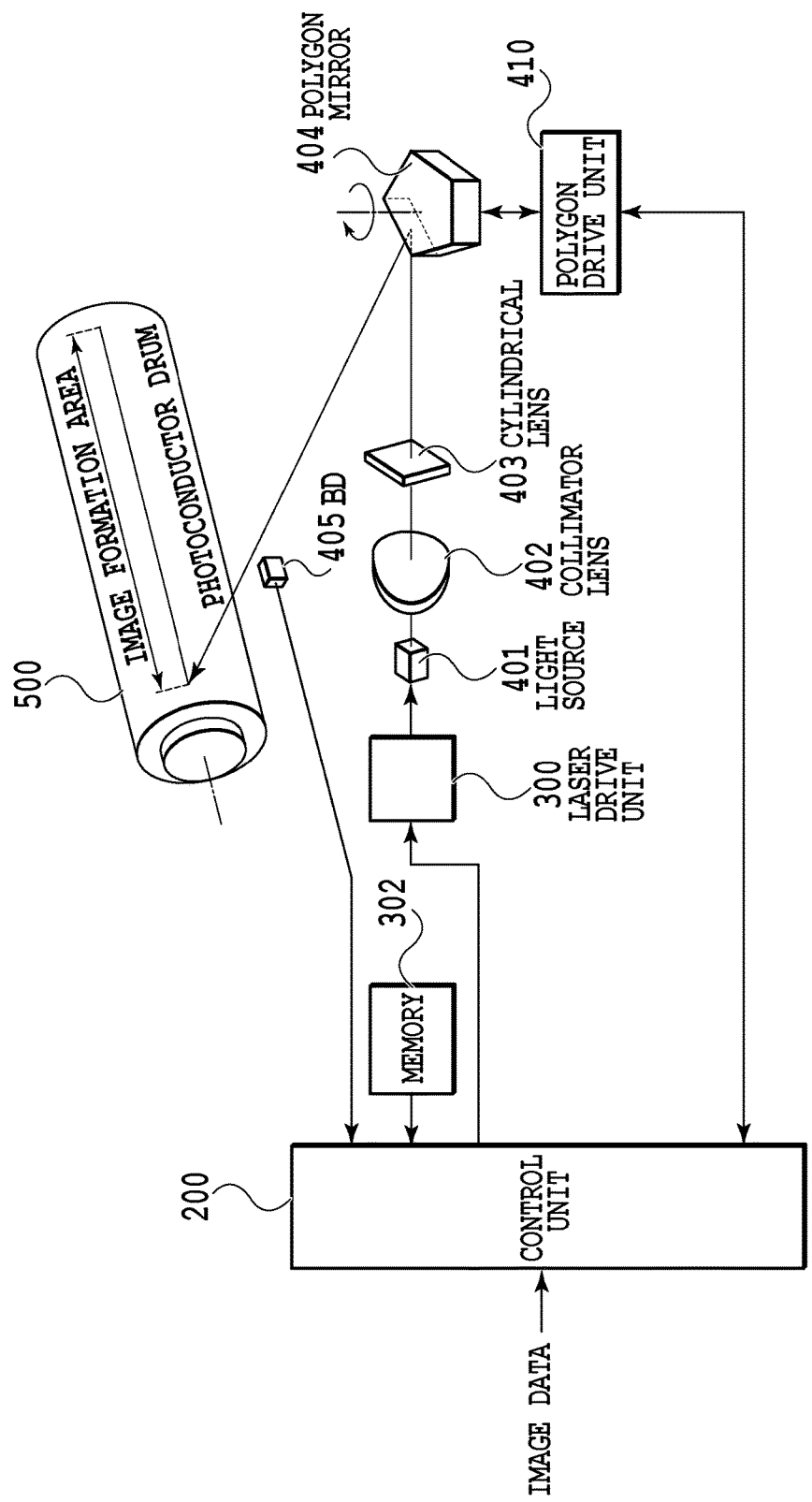
FIG. 2 is a diagram explaining details of an optical scanning device.

FIG. 2 is a diagram explaining details of the optical scanning device 400. The optical scanning device 400 includes each component of a light source 401, a collimator lens 402, a cylindrical lens 403, a polygon mirror (rotating polygon mirror) 404, which is a deflection unit, and a beam detector (BD) 405. Further, the optical scanning device 400 includes the laser drive unit 300 and the polygon mirror drive unit 410 described above as a drive system. The laser drive unit 300 generates a laser beam (here, multibeam) by supplying an electric current to the light source 401 based on the above-described VDO signal. The collimator lens 402 is a lens that shapes the generated laser beam into a parallel beam. The laser beam having passed through the collimator lens 402 is collected in a sub scanning direction (direction corresponding to the rotation direction of the photoconductor drum) by the cylindrical lens 403. Then, the laser beam is deflected by the polygon mirror (rotating polygon mirror) 404 so as to scan the photoconductor drum and irradiated onto the photoconductor drum 500. The polygon mirror 404 includes a motor unit that performs a rotation operation and a reflection mirror attached to the motor shaft and in the present embodiment, the polygon mirror 404 has five planes but the number of planes is not limited. The BD 405 detects the laser beam deflected by the polygon mirror 404 and outputs a main scanning synchronization signal (hereinafter, BD signal) that determines timing to write an electrostatic latent image based on the detected timing. The control unit 200 detects the write position of the scanning line based on the BD signal output from the BD 405 and detects the rotation speed of the polygon mirror 404 by counting the time interval of the BD signal. Then, the control unit 200 instructs the polygon mirror drive unit 410 to accelerate or decelerate the polygon mirror 404 so that a predetermined speed of the polygon mirror 404 is attained. The polygon mirror drive unit 410 supplies a drive current to the motor unit of the polygon mirror 404 in correspondence to the input acceleration/deceleration signal and drives the motor. The laser beam emitted from the optical scanning device 400 scans on the photoconductor drum 500 and exposes the photoconductor drum 500. The optical scanning device 400 and the photoconductor drum 500 are positioned so that the scanning direction of the laser beam is parallel to the rotation axis of the photoconductor drum 500. Each time the mirror plane of the polygon mirror 404 scans on the photoconductor drum 500 once, scanning lines in the number corresponding to the number of laser elements of the multibeam are formed at the same time. It is assumed that the control unit 200 includes a CPU, a RAM, and so on, and various kinds of control processing including the above-described laser beam scanning are implemented by the CPU reading predetermined programs stored in a ROM, an HDD, and so on, not shown schematically, loading the programs onto the RAM, and executing the programs.

(Image Control)

Figure 3:
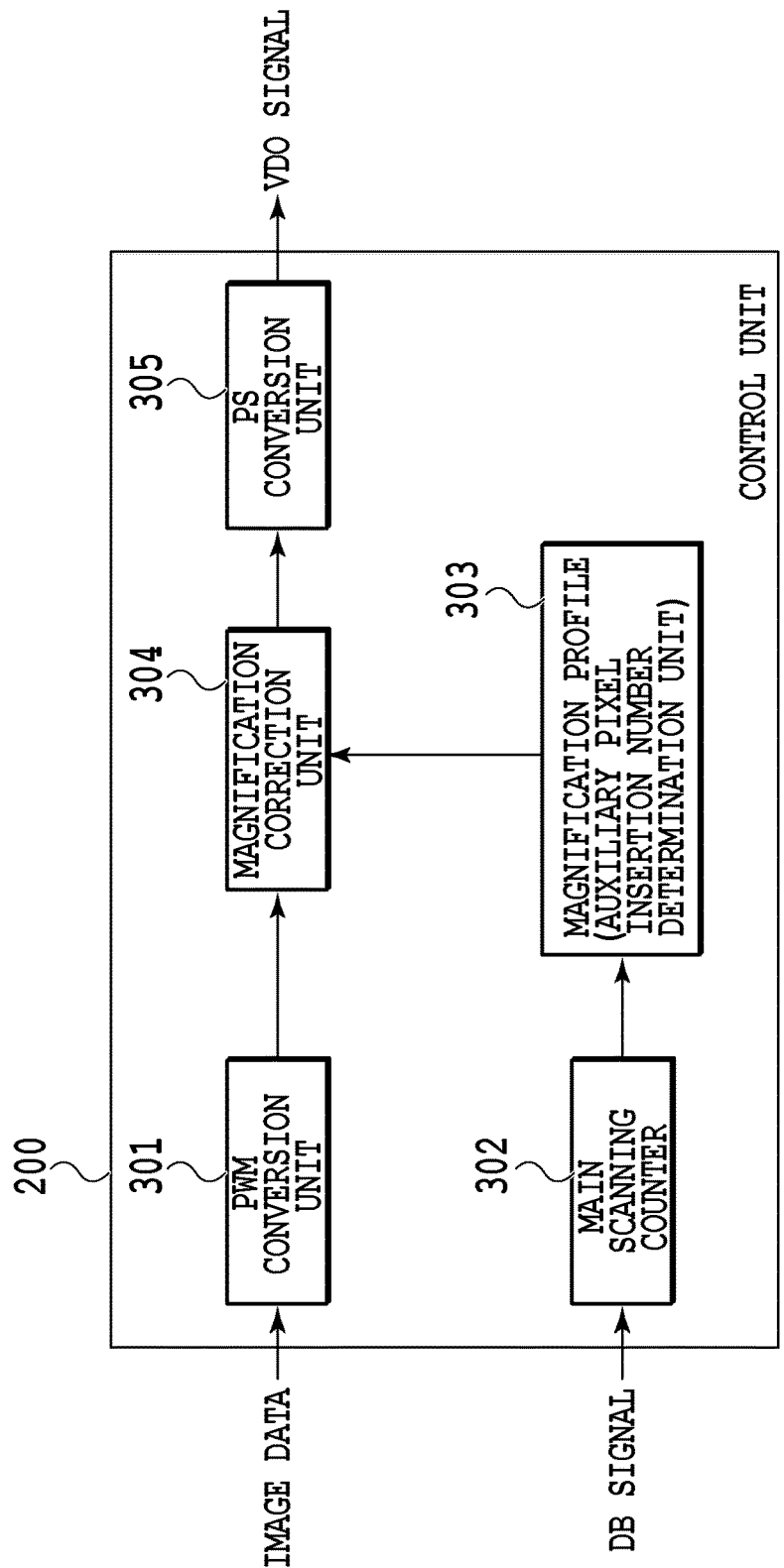
FIG. 3 is a function block diagram showing details inside a control unit.

Following the above, magnification correction based on the premise of digital PWM is explained in detail. FIG. 3 is a function block diagram showing details within the control unit 200 and each module to implement magnification correction based on the premise of digital PWM is shown. The control unit 200 includes a PWM conversion unit 301, a main scanning counter 302, an auxiliary pixel insertion number determination unit 303, a magnification correction unit 304, and a PS conversion unit 305. The control unit 200 performs magnification correction by using each unit based on input image data and a BD signal and outputs a VDO signal. In the following, detailed explanation is given.

Figures 4A, 4B, 4C:
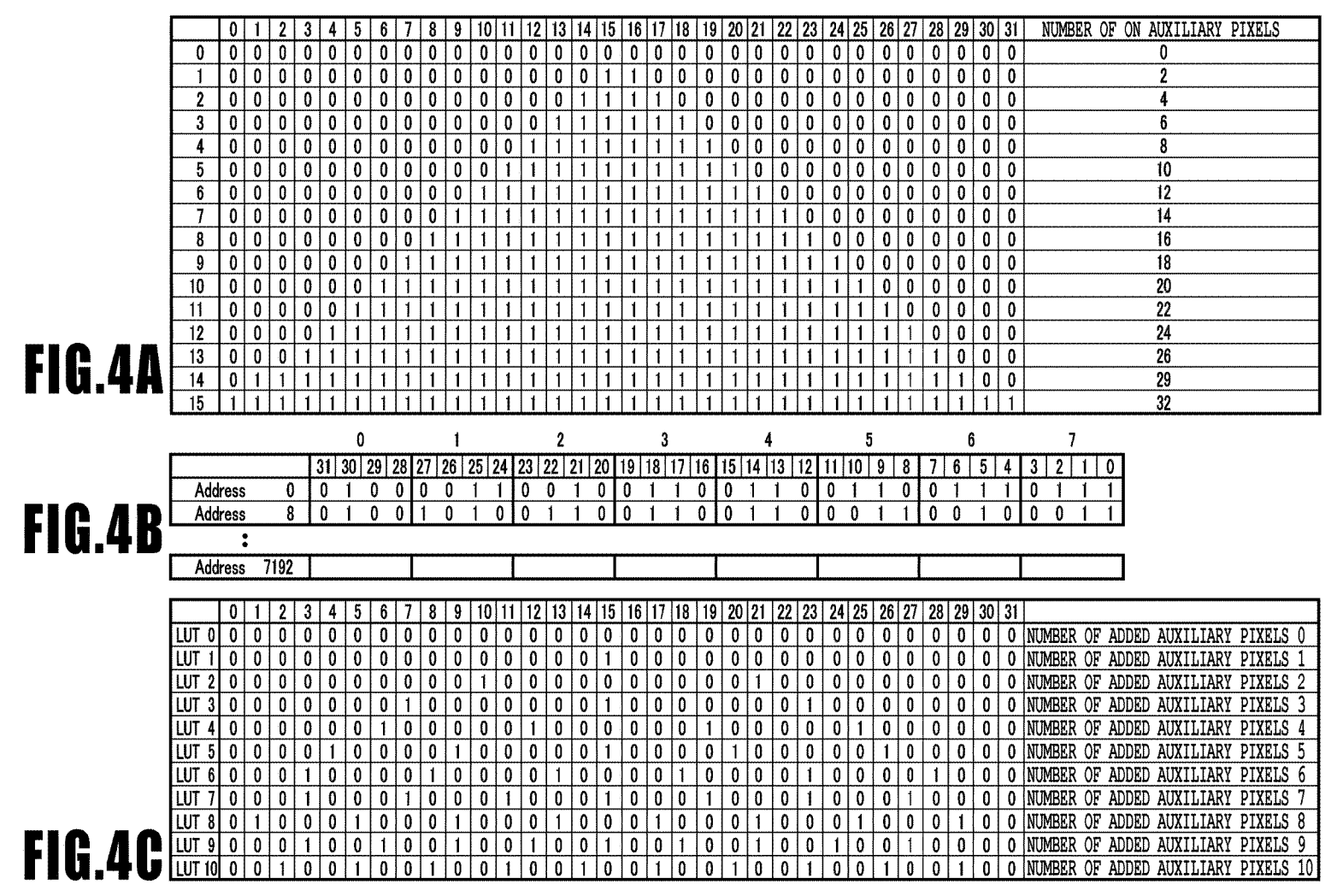

The PWM conversion unit 301 performs conversion processing by pulse width modulation for image data after halftone processing that is input. Further, the PWM conversion unit 301 stores a PWM conversion table for the conversion processing. By performing conversion processing with reference to the PWM conversion table, the input image data is converted into information corresponding to ON/OFF of the laser for printing in the image forming apparatus 100. In the present embodiment, one pixel (one dot) is divided into thirty-two units. The unit having a size of 1/32 of that of one pixel, which is obtained by dividing one pixel into thirty-two units, is called an "auxiliary pixel". This auxiliary pixel having a 1/32 size of that of one pixel is represented by 1-bit data. FIG. 4A is an example of the PWM conversion table in which "1" indicates an ON auxiliary pixel that is turned on and "0" indicates an OFF auxiliary pixel that is not turned on. Here, the table has sixteen steps in total from table No. 0 to table No. 15 and the number of ON auxiliary pixels in table No. 0 is zero and each time table No. increases by 1, the number of ON auxiliary pixels increases by two and the number of ON auxiliary pixels in table No. 15 is thirty-two. That the number of ON auxiliary pixels is thirty-two means that all the auxiliary pixels making up one pixel are turned on. The PWM conversion table shown in FIG. 4A is an example and the PWM conversion table is not limited to this. The table in FIG. 4A is a center growth type in which the ON auxiliary pixel begins to be entered at the center first and the number of ON auxiliary pixels increases stepwise toward the end portions, but the table may be, for example, an end portion growth type in which the number of ON auxiliary pixels increases from one end portion toward the other end portion. Further, a table may be accepted in which the number of ON auxiliary pixels increases by one or three each time in place of two (in the case where one pixel is divided into thirty-two ON auxiliary pixels and the number of ON auxiliary pixels increases by one each time, the table is a table including thirty-two tables). The PWM conversion unit 301 determines the numerical value of table No. that is applied based on the pixel value (here, a 4-bit value) of input image data after halftone processing that is input. For example, in the case where the input 4-bit value is "0000", table No. is 0 (table whose number of ON auxiliary pixels is zero) and the pixel is an OFF pixel (turned-off pixel) in which all the auxiliary pixels are OFF. Similarly, in the case where the input 4-bit value is "0001", table No. is 1 and the number of ON auxiliary pixels is two and in the case where the input 4-bit value is "0110", table No. is 6 and the number of ON auxiliary pixels is twelve. In the case where the input 4-bit value is "1111", table No. is 15 and the pixel is a fully ON pixel (turned-on pixel) in which all the thirty-two auxiliary pixels are ON.

Figure 5:
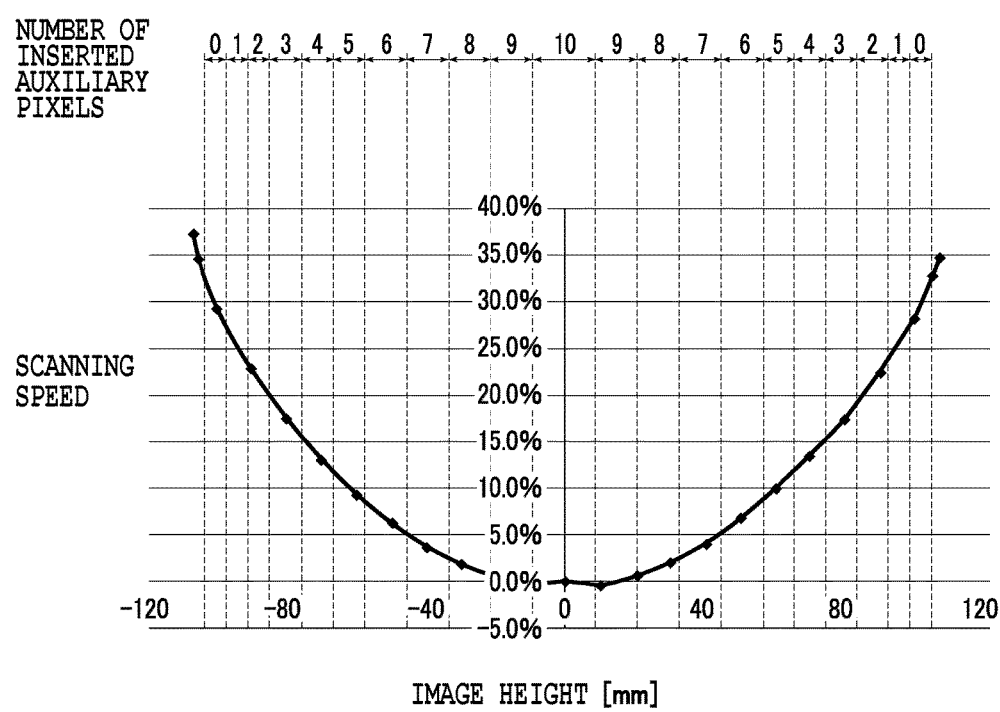
FIG. 5 is a diagram showing a relationship between the pixel position in the main scanning direction and the number of inserted auxiliary pixels.

The main scanning counter 302 is a counter that indicates the main scanning position and takes the top pixel of the main scanning to be a count value of "0" and increments the value (+1) for each pixel. For example, in the case where scanning is performed in the direction of the short side of an A3 sheet with a resolution of 600 dpi, the main scanning is covered by counting 7,200 pixels. The main scanning counter 302 is incremented in response to the BD signal. By taking the count value of the main scanning counter 302 to be an input value and based on a magnification profile, the number of auxiliary pixels to be inserted into each pixel is determined. The magnification profile is information that specifies a count value x of the main scanning counter 302 as an input value and the number of auxiliary pixels to be inserted into the pixel at the position indicated by the count value as an output value. In the case where it is assumed that the difference in scanning speed is 30% and the number N of divisions of a pixel is thirty-two, the number of auxiliary pixels to be inserted is in a range between zero and ten and four bits are necessary to indicate a value in this range. Consequently, in order to represent a magnification profile of each pixel in the case where there are 7,200 pixels in the main scanning direction, a memory of 7,200×4 bits/8=3,600 bytes is necessary and for example, this is implemented by an SRAM. FIG. 4B is a diagram showing an example in which a magnification profile is implemented by an SRAM and addresses corresponding to 7,200 pixels in total are shown. In FIG. 4B, "Address 0" or "Address 8" indicates the top address of each row. For example, the row of "Address 0" indicates the pixel position in the main scanning direction from address 0 to address 7 and the row of "Address 8" indicates the pixel position in the main scanning direction from address 8 to address 15. Then, in units of four bits corresponding to each pixel position, one of values indicating the number of auxiliary pixels from zero to ten is set. These values indicating the number of auxiliary pixels are written to the SRAM by the CPU within the control unit 200 after the power source of the image forming apparatus 100 is turned on. For example, it is assumed that the count value of the main scanning counter 302 is 1. In this case, this corresponds to the first four bits (bits 27 to 24) of the row of address 0, and therefore, "0011=3" is determined to be the magnification profile value (=number of auxiliary pixels to be inserted). Similarly, in the case where the count value is 9, this corresponds to the first four bits (bits 27 to 24) of the row of address 8, and therefore, "1010=10" is determined and in the case where the count value is 13, this corresponds to the fifth four bits (bits 11 to 8) of the row of address 8, and therefore, 0011=3" is determined to be the magnification profile value. Then, the magnification profile value determined for each pixel position of the main scanning is sent to the magnification correction unit 304. FIG. 5 is a diagram showing a relationship between the pixel position in the main scanning direction and the number of inserted auxiliary pixels. FIG. 5 shows that the number of inserted auxiliary pixels at both ends of a sheet is zero and the number of inserted auxiliary pixels increases stepwise toward the center and at the center, the number of inserted auxiliary pixels is ten, and it is known that the number of inserted auxiliary pixels needs to be changed in accordance with the main scanning speed.

The magnification correction unit 304 corrects the magnification for each pixel by inserting a predetermined number of auxiliary pixels in accordance with an auxiliary pixel insertion pattern determined in accordance with the magnification profile value (=number of auxiliary pixels to be inserted). The auxiliary pixel insertion pattern specifies the position within one dot (within one pixel) at which the auxiliary pixel is to be inserted and is associated with the number of auxiliary pixels to be inserted. In the present embodiment, for the thirty-two auxiliary pixels making up one pixel, the position of the auxiliary pixel to be inserted is stored in the form of a lookup table (hereinafter, called an "auxiliary pixel control table") in which the position of the auxiliary pixel to be inserted is indicated by "1". FIG. 4C shows an auxiliary pixel control table in the present embodiment and LUTs 0 to 10, i.e., eleven LUTs in total exist in accordance with the numbers of auxiliary pixels that may be added zero to ten. The auxiliary pixel control table in FIG. 4C corresponds to the center growth type PWM conversion table in FIG. 4A and includes LUTs consisting of auxiliary pixel insertion patterns in which the auxiliary pixel is added from the center and is a uniform type in which the interval between auxiliary pixel insertion positions is uniform. Then, for example, in the case where the received magnification profile value is 4 (0110), LUT No. 4 (LUT 4 in FIG. 4C) is selected and the number of auxiliary pixels to be inserted "four" is determined and (6, 12, 19, 25) are determined as the insertion positions of the four auxiliary pixels. In this manner, the auxiliary pixel is inserted in accordance with the auxiliary pixel insertion pattern determined based on the magnification profile value.

Figures 6A, 6B:
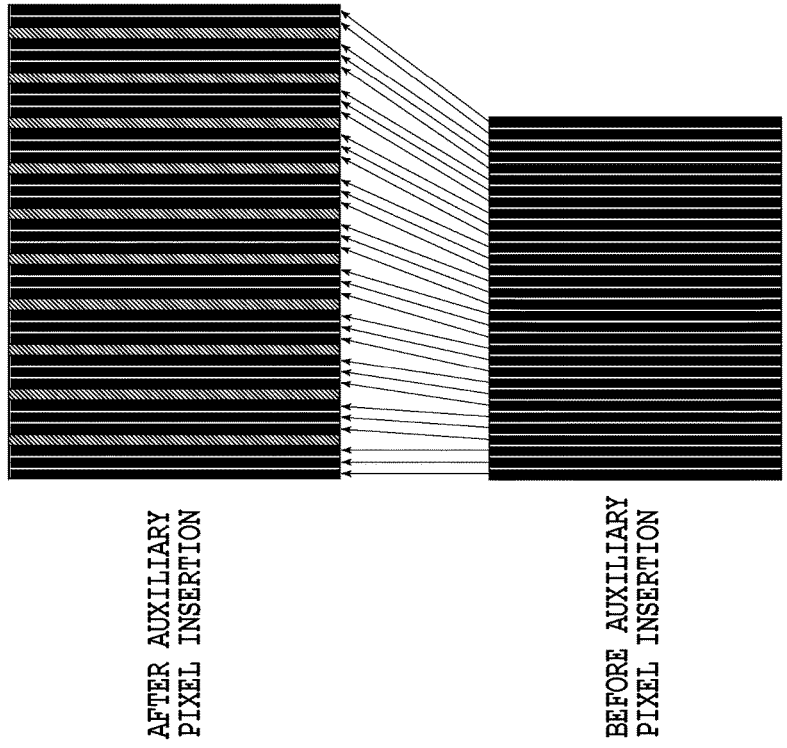
FIG. 6A and FIG. 6B are explanatory diagrams of auxiliary pixel insertion.

Here, by taking the case where the main scanning position is the center and ten ON auxiliary pixels are inserted as an example, the basic concept of auxiliary pixel insertion is explained with reference to FIG. 6A, FIG. 6B, FIG. 7A, and FIG. 7B. First, auxiliary pixel insertion in the case where the input pixel value after halftone processing is 1111 (all the thirty-two auxiliary pixels corresponding to one dot are ON) is explained. FIG. 6A is output results of the magnification correction unit 304. In FIG. 6A, figures of 0 to 41 in the first row indicate the total number of auxiliary pixels. Further, the portion where the two same figures are put side by side in the second row indicates the portion where the auxiliary pixel is added (the figure(s) enclosed by a circle corresponds to the added auxiliary pixel). The third row indicates ON and OFF of each auxiliary pixel by "1" and "0" and the thick figure "1" indicates the auxiliary pixel inserted in accordance with the main scanning position and the thin figure "1" indicates the original auxiliary pixel input from the PWM conversion unit 301. As the results of inserting ten ON auxiliary pixels to the pixel in which one dot includes thirty-two auxiliary pixels, the pixel becomes a pixel in which one dot includes forty-two auxiliary pixels. FIG. 6B shows the pixels before and after auxiliary pixel insertion by actual pixel images. The black rectangle indicates the original auxiliary pixel and the densely shaded rectangle indicates the inserted ON auxiliary pixel, respectively, and arrows indicate a correspondence relationship between the original auxiliary pixels before auxiliary pixel insertion and those after auxiliary pixel insertion. It is known from FIG. 6B that the ON auxiliary pixels are inserted to the portions of the bit where "1" exists in the auxiliary pixel control table of LUT No. 10 (LUT 10) in FIG. 4C. As described above, by adding ten auxiliary pixels (here, all the ten auxiliary pixels are ON pixels), the original pixel width becomes a pixel width about 130% of the original pixel width.

Figures 7A, 7B:
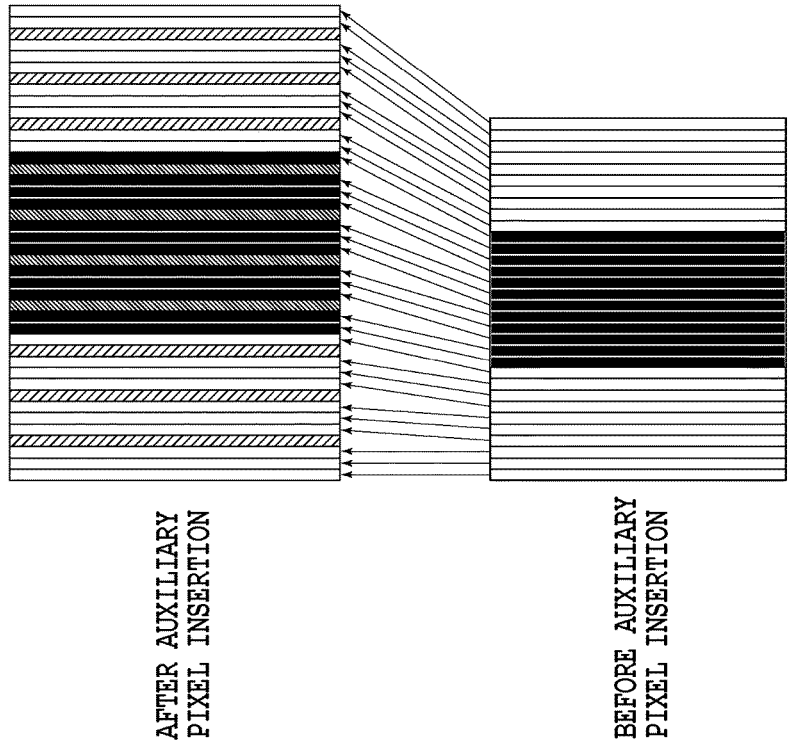
FIG. 7A and FIG. 7B are explanatory diagrams of auxiliary pixel insertion.

Next, auxiliary pixel insertion in the case where the input pixel value after halftone processing is 0110 (of thirty-two auxiliary pixels corresponding to one dot, twelve auxiliary pixels at the center are ON and the remaining twenty auxiliary pixels are OFF) is explained. FIG. 7A is output results of the magnification correction unit 304 and the thick figure "1" indicates the inserted auxiliary pixel and the thin figure "1" indicates the original auxiliary pixel input from the PWM conversion unit 301. As the results of inserting ten ON auxiliary pixels to the pixel in which one dot includes thirty-two auxiliary pixels, the auxiliary pixel becomes an auxiliary pixel in which one dot includes forty-two auxiliary pixels and this is the same as in FIG. 6A. However, in the case of FIG. 7A, of the ten inserted auxiliary pixels indicated by thick figure, only the 15th, 19th, 23rd, and 27th auxiliary pixels are "1 and the other 3rd, 7th, 11th, 31st, 35th, and 39th auxiliary pixels are "0". As a result of this, the number of ON auxiliary pixels that is originally twelve increases by four and becomes sixteen and the number of OFF auxiliary pixels that is originally twenty increases by six and becomes twenty-six. FIG. 7B shows the pixels before and after auxiliary pixel insertion by actual pixel images and the black rectangle indicates the original ON auxiliary pixel and the white rectangle indicates the original OFF auxiliary pixel. The densely shaded rectangle indicates the inserted ON auxiliary pixel and the lightly shaded rectangle indicates the inserted OFF auxiliary pixel. As in FIG. 6B, it is known that the ON auxiliary pixels are inserted to the portions of the bit where "1" exists in the auxiliary pixel control table of LUT No. 10 (LUT 10). By adding ten auxiliary pixels (here, four ON pixels and six OFF pixels) to one dot, the original pixel width becomes a pixel width about 130% of the original pixel width and this is the same as in FIG. 6B. In the case of FIG. 7B, the ON auxiliary pixels and the OFF auxiliary pixels are mixed but the percentage of the ON auxiliary pixels within one dot is 12/32=37.5% before the auxiliary pixel insertion and that after the auxiliary pixel insertion is 16/42=38%, indicating that the percentage of the auxiliary pixels is substantially the same before and after the auxiliary pixel insertion.

By inserting zero to ten auxiliary pixels in accordance with the pixel position of the main scanning based on the concept as described above, it is possible to output the same image as that in the case of the laser scanning optical system using the fθ lens.

The PS conversion unit 305 performs parallel/serial conversion and converts a signal of an image, into which zero to ten auxiliary pixels are inserted per dot in accordance with the scanning position, into a serial signal. This serial signal is input to an FIFO, not shown schematically, and accumulated in a line buffer, and output to the laser drive unit 300 as a VDO signal after a predetermined time elapses.

In the present embodiment, control to switch the auxiliary pixel control tables to be used in accordance with image processing applied to a printing-target input image is performed. In the following, by taking the case where ten auxiliary pixels are inserted per dot as an example, variations of the auxiliary pixel control table are explained. FIG. 8A shows two kinds of auxiliary pixel control table (only LUT No. 10 (LUT 10)) whose pattern of the insertion positions of ON auxiliary pixels is different from that in FIG. 4C described previously. Unlike FIG. 4C, the pattern indicatedby reference symbol 801 is a pattern in which the insertion positions of "1" indicating the ON auxiliary pixel are concentrated at both ends (end portion concentration type) and the pattern indicated by reference symbol 802 is a pattern in which the insertion positions of "1" indicating the ON auxiliary pixel are concentrated at the center (center concentration type). Here, as in FIG. 7A and FIG. 7B described previously, it is assumed that the input pixel value after halftone processing is 0110 (of thirty-two auxiliary pixels corresponding to one dot, twelve auxiliary pixels at the center are ON and the remaining twenty auxiliary pixels are OFF). FIG. 8B is output results of the magnification correction unit 304 and as in FIG. 7A, the thick figure "1" indicates the inserted auxiliary pixel and the thin figure "1" indicates the original auxiliary pixel input from the PWM conversion unit 301. Then, FIG. 8C is a diagram corresponding to FIG. 7B and shows the pixels before and after auxiliary pixel insertion by actual pixel images and the black rectangle indicates the original ON auxiliary pixel and the white rectangle indicates the original OFF auxiliary pixel. The densely shaded rectangle indicates the inserted ON auxiliary pixel and the lightly shaded rectangle indicates the inserted OFF auxiliary pixel, respectively, and both pixel widths indicated by reference symbols 821 and 822 become pixel widths about 130% of the original pixel widths, respectively. As the results of inserting ten auxiliary pixels to the pixel in which one dot includes thirty-two auxiliary pixels, the pixel becomes a pixel in which one dot includes forty-two auxiliary pixels, and this is the same as in the case of FIG. 7B, but the insertion positions are different in correspondence to the auxiliary pixel control table to be referred to, respectively. First, in output results indicated by reference symbol 811, the ten inserted auxiliary pixels indicated by the thick figure do not exist near the center and all the values are "0" and the percentage of the ON auxiliary pixels within one dot is reduced to 12/42=28.5%. Further, in output results indicated by reference symbol 812, the inserted auxiliary pixels indicated by the thick figure do not exist near both ends and of the ten auxiliary pixels, the number of auxiliary pixels indicated by "1" is six and the number of auxiliary pixels indicated by "0" is four, and the percentage of the ON auxiliary pixels within one dot increases to 18/42=43%.

Even in the case where the value after PWM conversion is the same and the number of auxiliary pixels to be inserted is the same as described above, by changing the auxiliary pixel control table that is referred to, it is possible to make the final output results to differ at the pixel level.

Figure 9:
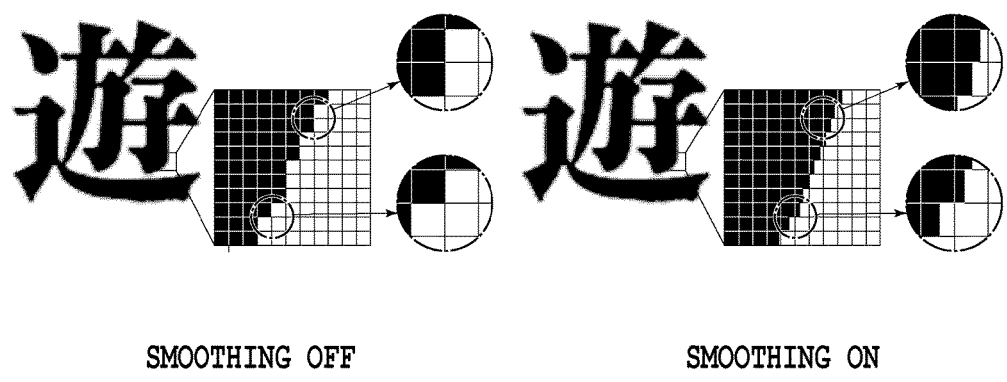
FIG. 9 is a diagram explaining an effect of smoothing processing.
Figure 10:
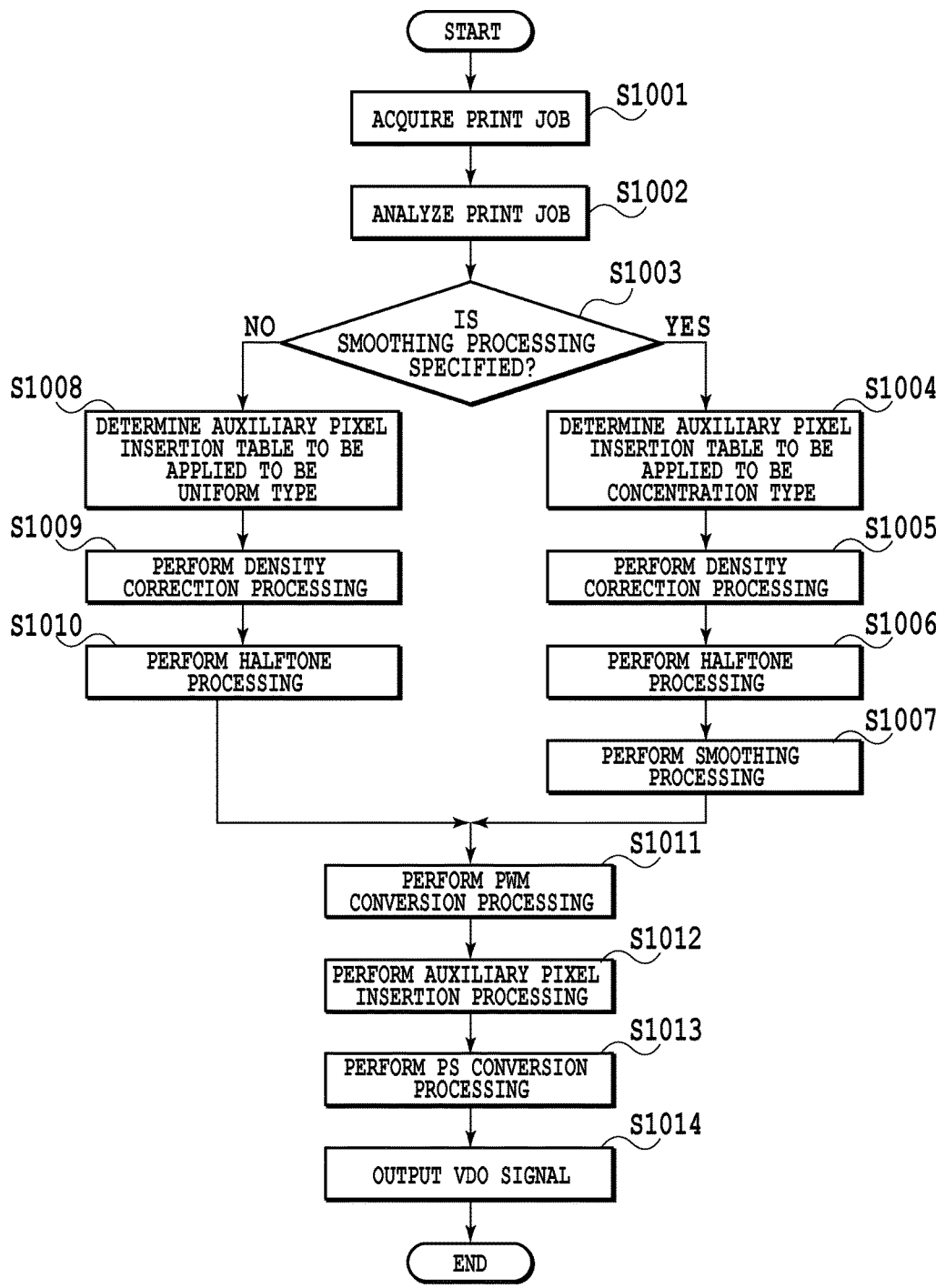
FIG. 10 is a flowchart showing a flow of printing processing accompanied by switch control of auxiliary pixel control tables.

Next, control to switch the auxiliary pixel control tables in accordance with the image processing to be applied at the time of printing is explained. Accompanying predetermined image processing aiming at high definition and high gradation that is performed for printing-target image data, there may be a case where only part of auxiliary pixels within one dot turn ON in PWM conversion processing. As the above-described predetermined image processing, mention is made of, for example, smoothing processing. The smoothing processing is image processing to smooth the contour of a character and graphics. FIG. 9 is a diagram explaining the effect of the smoothing processing and it is known that the jaggy (difference in the horizontal direction) in the contour portion can be made small by performing the smoothing processing. As described above, with the smoothing processing, it is possible to reduce the jaggy in the boundary portion of a character or the like by further dividing one pixel into an ON area (turned-on area) and an OFF area (turned-off area). In the case where the smoothing processing is performed, it is desirable to perform auxiliary pixel insertion at the end portion for the pixel, in particular, making up the boundary portion. Consequently, in the present embodiment, in the case where smoothing processing is specified in a print job, control to switch the auxiliary pixel control table from the uniform type to the end portion concentration type is performed. FIG. 10 is a flowchart showing a flow of printing processing accompanied by switch control of the auxiliary pixel control table.

At step 1001, a print job is acquired from a PC or the like, not shown schematically. At step 1002 that follows, the acquired print job is analyzed and image processing to be applied to printing-target image data is specified. That is, by this analysis, for example, whether application of the above-described smoothing processing is specified is determined. Then, at step 1003, the processing is branched in accordance with the results of the determination. In the present embodiment, in the case where application of the above-described smoothing processing is specified, the processing at each of steps 1004 to 1007 is performed and in the case where the application is not specified, the processing at each of steps 1008 to 1010 is performed.

First, the processing at each of steps 1004 to 1007 is explained. At step 1004, the auxiliary pixel control table that is referred to by the magnification correction unit 304 described previously is determined to be the end portion concentration type. Specifically, of the LUTs prepared in advance and stored in the HDD or the like according to type, the end portion concentration type LUT is read and written to the RAM. At step 1005 that follows, density correction processing is performed for the image data included in the print job and the density is corrected to an appropriate density. Further, at step 1006, halftone processing is performed and the image data is converted into image data (halftone data) with the number of tone levels with which the image forming apparatus 100 can represent density. Then, at step 1007, the smoothing processing described previously is performed for the halftone data. The halftone data for which the smoothing processing has been performed is sent to the PWM conversion unit 301.

Next, the processing at each of steps 1008 to 1010 is explained. At step 1008, the auxiliary pixel control table that is referred to by the magnification correction unit 304 described previously is determined to be the uniform time. Specifically, of the LUTs prepared in advance and stored in the HDD or the like according to type, the uniform type LUT is read and written to the RAM. At step 1009 that follows, the above-described density correction processing is performed and at step 1010, the above-described halftone processing is performed. Then, the generated halftone data is sent to the PWM conversion unit 301 without performing the smoothing processing.

At step 1011, the above-described PWM conversion processing is performed. Then, at step 1012, the auxiliary pixel insertion processing described previously is performed for the image signal (here, 32-bit signal) output from the PWM conversion unit 301 and zero to ten auxiliary pixels are inserted for each dot. Then, at step 1013, parallel/serial conversion processing is performed for the image signal after the auxiliary pixel insertion processing and the image signal is converted into a serial signal. At step 1014, a VDO signal based on the serial signal is output to the laser drive unit 300.

Figure 11:
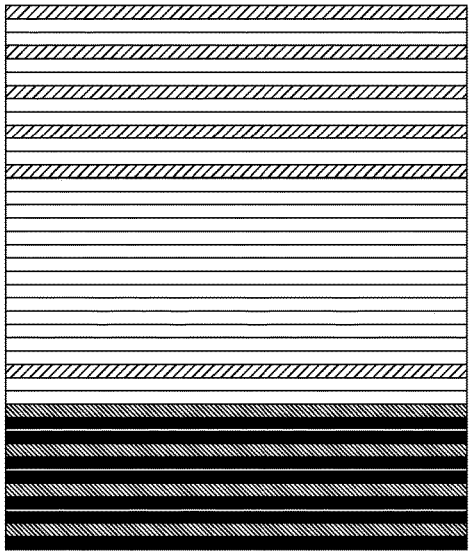
FIG. 11A to FIG. 11C are diagrams showing examples in which auxiliary pixels are inserted by using an end portion concentration type auxiliary pixel control table suitable for smoothing processing.
Figure 12:
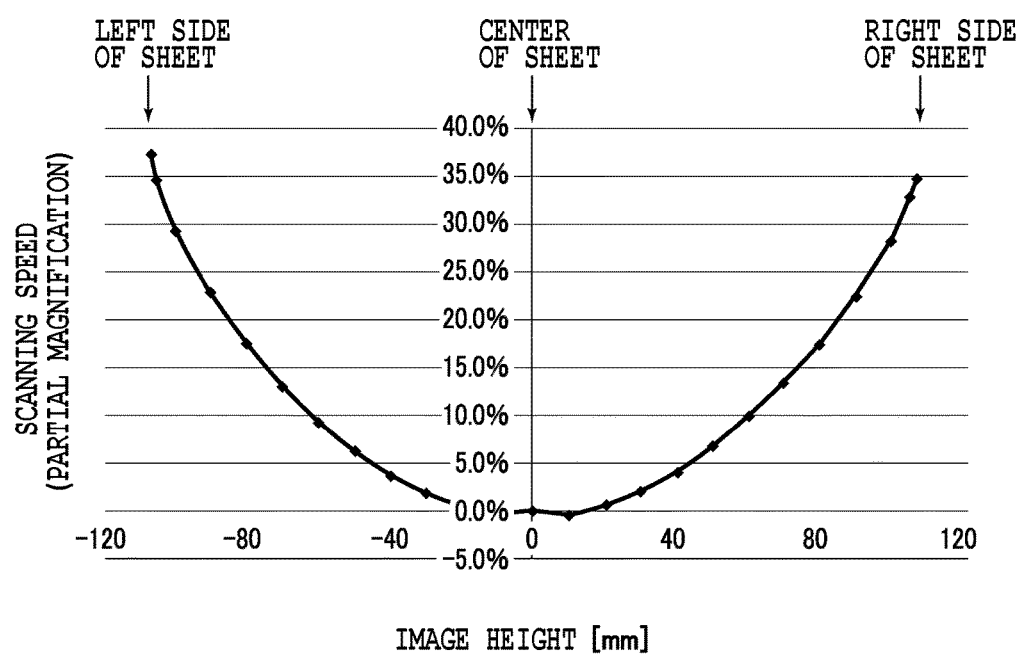
FIG. 12 is a graph representing characteristics of a laser scanning optical system that does not use an fθ lens.

The above is the contents of the printing processing accompanied by the switch control of the auxiliary pixel control table according to the present embodiment. FIG. 11A to FIG. 11C are diagrams showing an example in which auxiliary pixels are inserted by using the end portion concentration type auxiliary pixel control table appropriate for smoothing processing. FIG. 11A shows the case where a PWM conversion table whose number of ON auxiliary pixels is seven is selected based on the input pixel value after halftone processing and the positions of the ON auxiliary pixels are only 0th to 6th positions and only the left end side within one dot is the ON area (turned-on area). FIG. 11B is output results of the magnification correction unit 304 and the thick figure "1" indicates the inserted auxiliary pixel and the thin figure "1" indicates the original auxiliary pixel input from the PWM conversion unit 301. Then, FIG. 11C shows the pixels before and after auxiliary pixel insertion by actual pixel images and the black rectangle indicates the original ON auxiliary pixel and the white rectangle indicates the original OFF auxiliary pixel. The densely shaded rectangle indicates the inserted ON auxiliary pixel and the lightly shaded rectangle indicates the inserted OFF auxiliary pixel, respectively. As the results of inserting ten auxiliary pixels to the pixel in which one dot includes thirty-two auxiliary pixels, the pixel becomes a pixel in which one dot includes forty-two auxiliary pixel, and this is the same as in the case in FIG. 7A, FIG. 7B, FIG. 8A, FIG. 8B, and FIG. 8C but the insertion positions of the ON auxiliary pixel are only the left end portion by the end portion concentration type auxiliary pixel control table. That is, it is known in FIG. 11B that the ten inserted auxiliary pixels indicated by the thick figure do not exist near the center and the insertion positions of the ON auxiliary pixel whose value is "1" are the 1st, 4th, 7th, and 10th positions and concentrated on the left end side. As a result of this, it is possible to obtain output results in which the ON area (turned-on area) within one dot is wide, and the auxiliary pixel insertion is appropriate for the smoothing processing.

In the present embodiment, the example in which a more appropriate auxiliary pixel control table is selected is described by taking the case where the predetermined image processing is the smoothing processing as an example, but the application range of the present invention is not limited to this. The present invention may be applied to any example in which control is performed so as to appropriately select the auxiliary pixel control table to be used from among a plurality of pattern types, such as the uniform type, the center concentration type, and the end portion concentrate type, in accordance with the characteristics of the image processing applied to printing-target image data and to switch the auxiliary pixel control table to the selected table.

Further, in the present embodiment, explanation is given by taking the case where magnification correction is performed by inserting auxiliary pixels to the pixel on the end portion side of the main scanning position, but it is also possible to similarly apply the present invention to an aspect in which magnification correction is performed by removing auxiliary pixels or by combining insertion and removal. For example, it may also be possible to perform magnification correction by removing auxiliary pixels from the pixel on the center side of the main scanning position. In this case, the magnification profile is, for example, information to specify the number of auxiliary pixels to be removed and it is sufficient to configure the magnification correction unit 304 so as to perform processing to remove auxiliary pixels in accordance with an auxiliary pixel removal pattern prepared in advance based on the magnification profile value indicating the number of auxiliary pixels to be removed.

As above, according to the present embodiment, in the case where magnification correction by insertion and removal of auxiliary pixels is performed based on the premise of digital PWM in the image forming apparatus that does not use an fθ lens, the insertion positions in the auxiliary pixel control table are changed in accordance with the image processing method to be applied. Due to this, it is made possible to heighten the effect of the image processing to be applied to printing-target image data.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, in the case where magnification correction by insertion and removal of auxiliary pixels is performed based on the premise of digital PWM in the image forming apparatus that employs a laser scanning optical system that does not use an fθ lens, it is made possible to control the insertion and removal positions of auxiliary pixels in accordance with the purpose of each piece of image processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-117244, filed Jun. 13, 2016, which is hereby incorporated by reference herein in its entirety.

What is claimed is:

1. An image forming apparatus comprising:
a photoconductor;
an optical scanning device having a light source that emits a laser beam, a deflection unit configured to deflect the laser beam so that the laser beam scans on the photoconductor, and an optical system that does not have an fθ lens and which guides the laser beam deflected by the deflection unit onto the photoconductor;
a conversion unit configured to perform PWM conversion processing for input image data;
a correction unit configured to perform, for each pixel of the image data for which the PWM conversion processing has been performed, magnification correction processing in accordance with a pixel position in a main scanning direction of the laser beam by inserting or removing an auxiliary pixel that is a unit obtained by dividing one pixel in plurality, or by combining insertion and removal;
a counter that indicates the pixel position in the main scanning direction; and
a specification unit configured to specify image processing applied to the image data by analyzing a print job,
wherein a position where the auxiliary pixel is inserted or removed is different in accordance with the specified image processing to be applied to the image data,
wherein the correction unit determines, for each pixel, a number of auxiliary pixels to be inserted or removed and insertion positions or removal positions of auxiliary pixels, based on a count value of the counter,
wherein the correction unit determines a number of auxiliary pixels to be inserted or removed for each pixel by using a magnification profile that specifies the count value as an input value and a number of auxiliary pixels to be inserted or removed for a pixel at a position indicated by the count value as an output value,
wherein the correction unit inserts or removes the auxiliary pixel in accordance with a control table in which a number of auxiliary pixels to be inserted or removed and each predetermined pattern that specifies positions within one pixel where an auxiliary pixel is inserted or removed are associated with each other, and wherein the control table to be used in the magnification correction processing is determined in accordance with the specified image processing to be applied to the image data.

2. The image forming apparatus according to claim 1, wherein as the control table, a plurality of types in which the predetermined pattern is different in accordance with the characteristics of image processing that may be applied to the image data is prepared, and a control table of a type appropriate for image processing specified by the specification unit is determined from the plurality of types.

3. The image forming apparatus according to claim 2, wherein variations of the control table include at least one of a uniform type in which positions where the auxiliary pixel is inserted or removed are at uniform intervals, an end portion concentration type in which positions where the auxiliary pixel is inserted or removed are concentrated at both ends of a pixel, and a center concentration type in which positions where the auxiliary pixel is inserted or removed are concentrated at the center of a pixel.

4. An image forming method that uses a laser scanning optical system that does not have an fθ lens and in which a scanning speed of a laser beam is not uniform on a photoconductor surface, the method comprising:

performing PWM conversion processing for input image data;

performing, for each pixel of the image data for which the PWM conversion processing has been performed, magnification correction processing in accordance with a pixel position in a main scanning direction of the laser beam by inserting or removing an auxiliary pixel that is a unit obtained by dividing one pixel in plurality, or by combining insertion and removal;

counting the pixel position in the main scanning direction using a counter; and specifying image processing applied to the image data by analyzing a print job, wherein a position where the auxiliary pixel is inserted or removed is different in accordance with the specified image processing to be applied to the image data, wherein said magnification correction processing determines, for each pixel, a number of auxiliary pixels to be inserted or removed and insertion positions or removal positions of auxiliary pixels, based on a count value of the counter, wherein said magnification correction processing determines a number of auxiliary pixels to be inserted or removed for each pixel by using a magnification profile that specifies the count value as an input value and a number of auxiliary pixels to be inserted or removed for a pixel at a position indicated by the count value as an output value, wherein said magnification correction processing inserts or removes the auxiliary pixel in accordance with a control table in which a number of auxiliary pixels to be inserted or removed and each predetermined pattern that specifies positions within one pixel where an auxiliary pixel is inserted or removed are associated with each other, and wherein the control table to be used in the magnification correction processing is determined in accordance with the specified image processing to be applied to the image data.

5. A non-transitory computer readable storage medium storing a program for causing a computer to perform a method of adjusting a main scanning start position in an image forming apparatus having a scanning optical system that does not have an fθ lens and in which a scanning speed of a laser beam is not uniform on a photoconductor surface, the method comprising:

performing PWM conversion processing for input image data;

performing, for each pixel of the image data for which the PWM conversion processing has been performed, magnification correction processing in accordance with a pixel position in a main scanning direction of the laser beam by inserting or removing an auxiliary pixel that is a unit obtained by dividing one pixel in plurality, or by combining insertion and removal;

counting the pixel position in the main scanning direction using a counter; and specifying image processing applied to the image data by analyzing a print job, wherein a position where the auxiliary pixel is inserted or removed is different in accordance with the specified image processing to be applied to the image data, wherein said magnification correction processing determines, for each pixel, a number of auxiliary pixels to be inserted or removed and insertion positions or removal positions of auxiliary pixels, based on a count value of the counter, wherein said magnification correction processing determines a number of auxiliary pixels to be inserted or removed for each pixel by using a magnification profile that specifies the count value as an input value and a number of auxiliary pixels to be inserted or removed for a pixel at a position indicated by the count value as an output value, wherein said magnification correction processing inserts or removes the auxiliary pixel in accordance with a control table in which a number of auxiliary pixels to be inserted or removed and each predetermined pattern that specifies positions within one pixel where an auxiliary pixel is inserted or removed are associated with each other, and wherein the control table to be used in the magnification correction processing is determined in accordance with the specified image processing to be applied to the image data.

* * * * *